United States Patent [19]

Unterstenhoefer et al.

[11] 3,899,455

[45] Aug. 12, 1975

[54] PROCESS FOR PREPARING LIGHTWEIGHT CONCRETE

[75] Inventors: Leo Unterstenhoefer, Limburgerhof; Wilhelm Krieger, Ludwigshafen, both of Germany

[73] Assignee: BASF Wyandotte Corporation, Wyandotte, Mich.

[22] Filed: Apr. 18, 1974

[21] Appl. No.: 461,946

[52] U.S. Cl. .... 260/2.5 B; 117/100 R; 260/28.5 AS
[51] Int. Cl. ............................................ C08f 47/08
[58] Field of Search ............... 260/2.5 B; 117/100 R

[56] References Cited
UNITED STATES PATENTS

| | | | |
|---|---|---|---|
| 3,198,758 | 8/1965 | Donnelly | 260/2.5 B |
| 3,214,393 | 10/1965 | Sefton | 260/2.5 B |
| 3,257,338 | 6/1966 | Sefton | 260/2.5 B |
| 3,272,765 | 9/1966 | Sefton | 260/2.5 B |
| 3,705,116 | 12/1972 | Vargiu et al. | 260/2.5 B |
| 3,705,117 | 12/1972 | Vargiu et al. | 260/2.5 B |
| 3,711,431 | 1/1973 | Vargiu et al. | 260/2.5 B |
| 3,733,285 | 5/1973 | Steffy | 260/2.5 B |
| 3,795,653 | 3/1974 | Aignesberger et al. | 260/2.5 B |

*Primary Examiner*—Morton Foelak
*Attorney, Agent, or Firm*—Bernhard R. Swick; Joseph D. Michaels; Robert E. Dunn

[57] ABSTRACT

The adhesion of foamed particles, e.g., foamed polystyrene beads, in a lightweight concrete composition is improved by surface coating the foamed particles prior to incorporation into the lightweight concrete mixture with a phenol containing (1) coal tar or (2) anthracene oil and cross-linkable phenolic resin blend.

9 Claims, No Drawings

PROCESS FOR PREPARING LIGHTWEIGHT CONCRETE

BACKGROUND

1. Field of the Invention

The present invention concerns a procedure for the manufacture of lightweight concrete from hydraulic binders, water and closed-celled foam particles.

2. Description of the Prior Art

The preparation of lightweight concrete by blending foam particles, particularly such as are derived from foamed polystyrene, with hydraulic binders and water is known as such. It is furthermore known to the art to use, in the manufacture of such a lightweight concrete, adhesion promoters which are based on epoxy resins. To this effect, the foamed particles are treated with an aqueous dispersion of an epoxy resin, prior to their being incorporated into the hydraulic binding agent with the required amount of water. In addition to the aqueous dispersion of the epoxy resin such solvents as benzene, toluene, and xylene may be added. It has now been found that lightweight concrete of excellent characteristics can be prepared in economical fashion, according to the procedure of this invention.

SUMMARY OF THE INVENTION

In accordance with this invention there is provided a means of increasing the adhesion of foamed particles in a lightweight concrete composition comprising hydraulic binder, water and closed cell foamed particles, the improvement comprising surface coating the closed cell foamed particles prior to their incorporation into the lightweight concrete mixture with a phenol containing (1) coal tar or (2) anthracene oil and cross-linkable phenolic resin blend.

DESCRIPTION OF THE PREFERRED EMBODIMENT

The closed-cell foamed particles employed in this invention are expanded thermoplastic particles, typically in bead or spherical shape and preferably made of polystyrene.

A suitable anthracene oil for the purpose of this invention is typified by a commercially available anthracene oil which is characterized by the following analysis: distillation curve having an initial boiling point of 200°C, with 20% volatiles at 250°C, 60% volatiles at 300°C, and 90% volatiles at 360°C; density 1.07; initial crystallization +3°C; and which can contain methyl- and dimethyl-naphthalene, phenols (2–3%), carbazoles, phenantrenes and the corresponding methylated products in addition to anthracene.

Such an anthracene oil is suitably blended in amounts of from 1 to 3.5 parts (all parts are based on weight) and preferably in amounts of 2.5 parts with from 1 to 2 parts and preferably 1.25 parts of cross-linkable phenol resin to produce an emulsion. The so-obtained emulsion is then sprayed onto the closed-celled foam particles, preferably closed-celled polystyrene foam particles are under consideration.

As coal tar, preferably a cable tar (approximately 40% pitch content, 60% tar oils of viscosity 7° Engler at 50°C) is used; this cable tar is sprayed onto the foamed polystyrene and subsequently the so-prepared polystyrene is blended with the hydraulic binder and the requisite amount of water.

As hydraulic binders any of the conventional types of cement can be used and the Portland type is very satisfactory. In keeping with conventional concrete technology various types of aggregate such as sand, filter dust, slate-flour, etc., can also be used to obtain desired physical properties. The ratio of cement to foamed polystyrene particles depends on the desired density of the lightweight concrete, the amount of water required for the setting of the mix depends on the amount of cement used. The most desirable weight ratio of water to cement is 0.45 to 0.55. By the procedure according to this invention, lightweight concrete of density 0.2 kilogram/liter to 1.0 kilogram/liter and higher can be produced. For manufacture, a gravity type or a machine type mixing device can be used.

The following examples are included to illustrate the preparation of the closed cell foamed particles of this invention and their use in lightweight concrete but the examples are not to be considered limiting. Unless otherwise specified all parts are by weight and all temperatures are expressed as degrees centigrade.

In the examples foamed polystyrene of 15 grams/liter density with a particle diameter of the beads of from 1 to 3.0 millimeters was used. The hydraulic binder was type 350 Portland cement.

For testing the compositions prepared in each example, three cubes of 100 × 100 × 100 millimeters and three beams of 700 × 150 × 100 millimeters dimensions were produced according to the standard conditions for concrete preparation. As the above molded specimens were cast, a densification of from 5 to 8% occurred. The finished sections were tested according to DIN 1048. The test specimens were removed from the mold 24 hours after filling, put in water and after 7 days they were removed from water. The cubes were dried at room temperature, 20°C, and the beams were kept wet to the testing day with wet cloths.

On the 28th day after preparation of the test specimens, the cubes were used for density determination and compression strength determinations, and the beams were used for determining the bending tensile strength. The tests were carried out at a pressure increase of 1000 kilograms/minute.

EXAMPLE 1

In this example a lightweight concrete of density 0.2 kilogram/liter (kg/l) was prepared.

A coating for the closed cell foam particles was prepared by emulsifying together with an agitator the following ingredients:

- 84.0 g Anthracene oil described above
- 42.0 g Phenol resin (alkaline condensation product consisting of 1 mol of phenol and 2 mols of formaldehyde)
- 4.2 g of a mixture consisting of 76 parts of formamide, 19 parts of butyrolactone and 4.8 parts of boric acid (phenolic resin crosslinker).

The above emulsified coating was then applied to 38 liters of foamed polystyrene (15 grams/liter) in a free fall blender by spraying and mixing until all particles were covered. Then 5.15 kilograms of Portland cement PZ 350 and 2.68 kilograms of water were added, and by blending a homogenous mixture was produced. The mixture was charged into the molds to obtain the abovedescribed test specimens. After curing the molded particles were tested. The results are tabulated in the table below.

EXAMPLE 2

For preparing a lightweight concrete of density 0.5 kilogram/liter, the same procedure as described in Example 1 was followed, however, for each 38 liters of foamed polystyrene of 15 g/l density, 13,5 kilograms of Portland cement PZ 350 and 6.16 kilograms of water were used. The test results obtained on the cast molded articles are listed in Table 1 below.

EXAMPLE 3

For preparation of a lightweight concrete of density 0.8 kilogram/liter, Example 1 was repeated, however:
35.9 liters of coated foamed polystyrene (15 g/l)
16.2 kilograms of Portland cement PZ 350
6.97 kilograms of regular sand
7.30 kilograms of water
were used. The results obtained again are found in Table 1.

EXAMPLE 4

For preparing a lightweight concrete of density 0.2 kilogram/liter, 90 grams cable tar was sprayed onto 38 liters of foamed polystyrene of 15 grams/liter density in a free fall blender until all particles were completely covered. After this 5.15 kilograms of Portland cement 350 and 2.68 kilograms of water were added and by blending until a homogenous mixture was produced, which was charged into the molds. The specimens were cured and tested as described above. The result is reported in Table 1 below.

EXAMPLE 5

Following the procedure as described in Example 4 was a lightweight concrete of density 0.5 kilogram/liter prepared with 38 liters of coated foamed polystyrene of 15 grams/liter density, 13.5 kilograms of Portland cement PZ 350 and 6.16 kilograms of water. The composition was charged to the molds and test specimens prepared. The test results are listed in Table 1.

EXAMPLE 6

Following the procedure described in Example 4 a lightweight concrete of density 0.8 kilogram/liter was prepared with 35.9 liters of foamed polystyrene of density 15 grams/liter, 16.2 kilograms of Portland cement PZ 350, 6.97 kilograms of regular sand, and 7.3 kilograms of water. The composition was charged to the molds and test specimens were prepared and tested. The test results are stated in the table below.

The foregoing examples and methods have been described in the foregoing specification for the purpose of illustration and not limitation. Many other modifications and ramifications will naturally suggest themselves to those skilled in the art based on this disclosure. These are intended to be in the scope of this invention.

Table 1

| Example | Pressure | Tensile Strength kg/cm$^2$ Bending Tensile |
|---|---|---|
| 1 | 2.00 | 1.80 |
| 2 | 15.00 | 7.80 |
| 3 | 31.40 | 12.50 |
| 4 | 2.00 | 1.80 |
| 5 | 13.00 | 7.50 |
| 6 | 27.00 | 12.50 |

It is claimed:

1. In a method of preparing lightweight concrete compositions containing hydraulic binder, water and closed cell foamed polystyrene particles the improvement of increasing the adhesion of the foamed particles to the cured or set concrete composition comprising surface coating the closed cell foamed particles prior to their incorporation into the lightweight concrete mixture with a phenol containing (1) coal tar or (2) anthracene oil and cross-linkable phenolic resin blend.

2. The improvement of claim 1 wherein the phenol containing material is coal tar.

3. The improvement of claim 2 wherein the coal tar is a cable tar containing about 40 percent by weight of pitch and about 60 percent by weight of tar oils and has a viscosity of 7° Engler at 50°C.

4. The improvement of claim 3 wherein the tar is applied at the rate of 90 grams per 38 liters of foamed particles.

5. The improvement of claim 1 wherein the phenol containing material is an emulsion of from 1 to 3.5 parts by weight of said oil and from 1 to 2 parts by weight of said resin plus 10 weight percent based on said resin cross-linker.

6. The improvement of claim 5 wherein said oil is present in the amount of 2.5 parts and said resin is present in the amount of 1.25 parts.

7. The improvement of claim 6 wherein the emulsion is applied at the rate of about 130 grams per 38 liters of foamed particles.

8. The improvement of claim 1 wherein the closed cell foamed particles are foamed polystyrene beads.

9. The improvement of calim 1 wherein said foamed particles are surface coated by spraying.

* * * * *